Nov. 28, 1933.         A. F. MASURY         1,936,847
CHAIN HOUSING FOR INDIVIDUALLY SPRUNG WHEELS
Filed Aug. 6, 1932
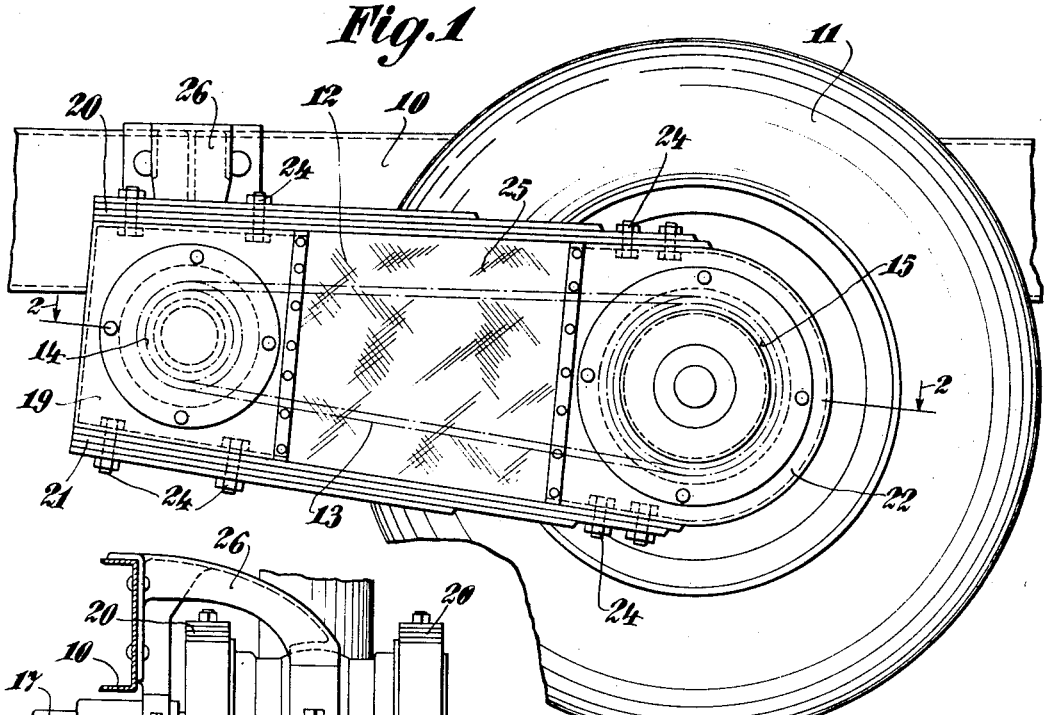
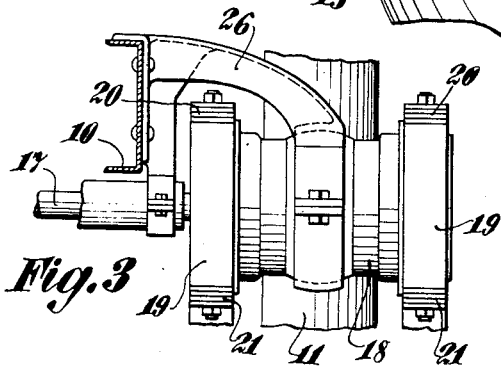
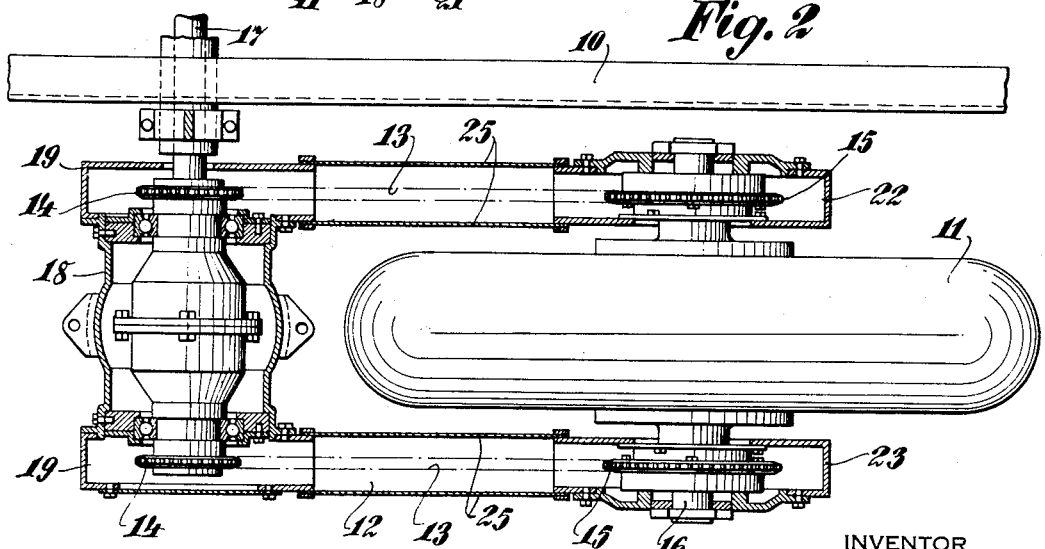
INVENTOR
Alfred F. Masury,
BY Redding, Greeley, O'Shea & Campbell
HIS ATTORNEYS Patented Nov. 28, 1933

1,936,847

UNITED STATES PATENT OFFICE 1,936,847

CHAIN HOUSING FOR INDIVIDUALLY SPRUNG WHEELS

Alfred F. Masury, New York, N. Y., assignor to International Motor Company, New York, N. Y., a corporation of Delaware Application August 6, 1932. Serial No. 627,793

4 Claims. (Cl. 180—72)

The present invention relates to motor vehicle constructions and embodies, more specifically, an improved means for mounting individually sprung wheels upon motor vehicles whereby the weight of the vehicle may be effectively transmitted to the wheels, the construction being such that the wheels may be driven from a suitable power source upon the vehicle frame.

Individually mounted wheels have heretofore been provided wherein springs have been utilized to mount the same upon the vehicle frames. These constructions have been such that housings have been required to protect the driving elements between the frame and wheel. In order that the weight and cost of these individual wheel mountings may be reduced, the present invention has been designed and an object thereof is to provide a mounting structure for individually mounted wheels wherein the weight and cost of such structure is materially decreased.

A further object of the invention is to provide a mounting structure for individually mounted wheels wherein the springs serving to mount the wheel upon the vehicle frame also constitute portions of the housings in which the driving elements are enclosed.

A further object of the invention is to provide a device of the above character wherein the vehicle springs are utilized in combination with a light flexible material for providing a closure for the driving elements.

Further objects, not specifically enumerated above, will be apparent as the invention is described in greater detail in connection with the accompanying drawing, wherein:

Figure 1 is a view in side elevation showing a housing for an individually mounted wheel constructed in accordance with the present invention.

Figure 2 is a plan view, taken in section on line 2—8 of Figure 1, and looking in the direction of the arrows.

Figure 3 is a detail view showing the means by which the individually mounted wheel shown in Figures 1 and 2 is mounted upon the vehicle frame.

With reference to the above drawing, a vehicle frame is shown at 10 and is mounted upon a plurality of wheels 11. The wheels 11 may include driving wheels which are journaled between spaced arms of a supporting housing 12. Within the spaced arms driving chains 13 (indicated in dot and dash lines in Figures 1 and 2) are provided, these chains being mounted over driving and driven sprockets 14 and 15, respectively. Driven sprockets 15 are secured to a shaft 16 which is journaled within the spaced arms and upon which wheel 11 is secured. Driving sprockets 14 are driven from a shaft 17 in accordance with existing practice, the driving elements being enclosed within a mounting head 18, at the ends of which mounting members 19 are secured.

Upon the mounting members 19 upper and lower springs 20 and 21, respectively, are secured, the springs extending rearwardly and forming the tops and bottoms of the mounting arms. At the extremities of the springs, mounting members 22 and 23 are provided, the springs being secured to the upper and lower surfaces thereof by means of bolts 24. Upon opposite sides of each of the vertically spaced springs, flexible members 25 are secured, these members being formed of any suitable material which will permit the spring to yield during their normal functioning.

The head 18 is rigidly secured upon the frame by means of a bracket 26, the details of these mounting members forming no part of the present invention and therefore not being described in detail herein.

From the foregoing, it will be seen that the driving elements between the shaft 17 and the wheel 11 are effectively enclosed within flexible housings which constitute the spring means for mounting the frame upon the wheels. The weight and cost of the mounting structure is thus greatly reduced over existing designs and while the invention has been described with specific reference to the accompanying drawing, it is not to be limited save as defined in the appended claims.

I claim as my invention:

1. A mounting for an individual wheel comprising a member mounted on a vehicle frame and having vertically spaced springs mounted thereon, a wheel journalling member, means to secure the last named member between the ends of the springs, and closure members mounted between the first members and spaced by the springs.

2. A mounting for an individual wheel comprising a member mounted on a vehicle frame and having vertically spaced springs mounted thereon, a wheel journalling member, means to secure the last named member between the ends of the springs, driving means between the springs and members, and closure members mounted between the first members and spaced by the springs.

3. A mounting for an individual wheel comprising a member mounted on a vehicle frame and having vertically spaced springs mounted thereon, a wheel journalling member, means to secure the last named member between the ends of the springs, driving means between the springs and members, and flexible closure members mounted between the first members and spaced by the springs.

4. A mounting for an individual wheel comprising a member mounted on a vehicle frame and having pairs of vertically spaced springs mounted thereon, members secured between the ends of the springs, a wheel journaled in the last named members, driving means between the respective first members and wheel journalling members, and flexible closure members secured between the vertically spaced edges of the springs and horizontally spaced edges of the members.

ALFRED F. MASURY.